1,502,952

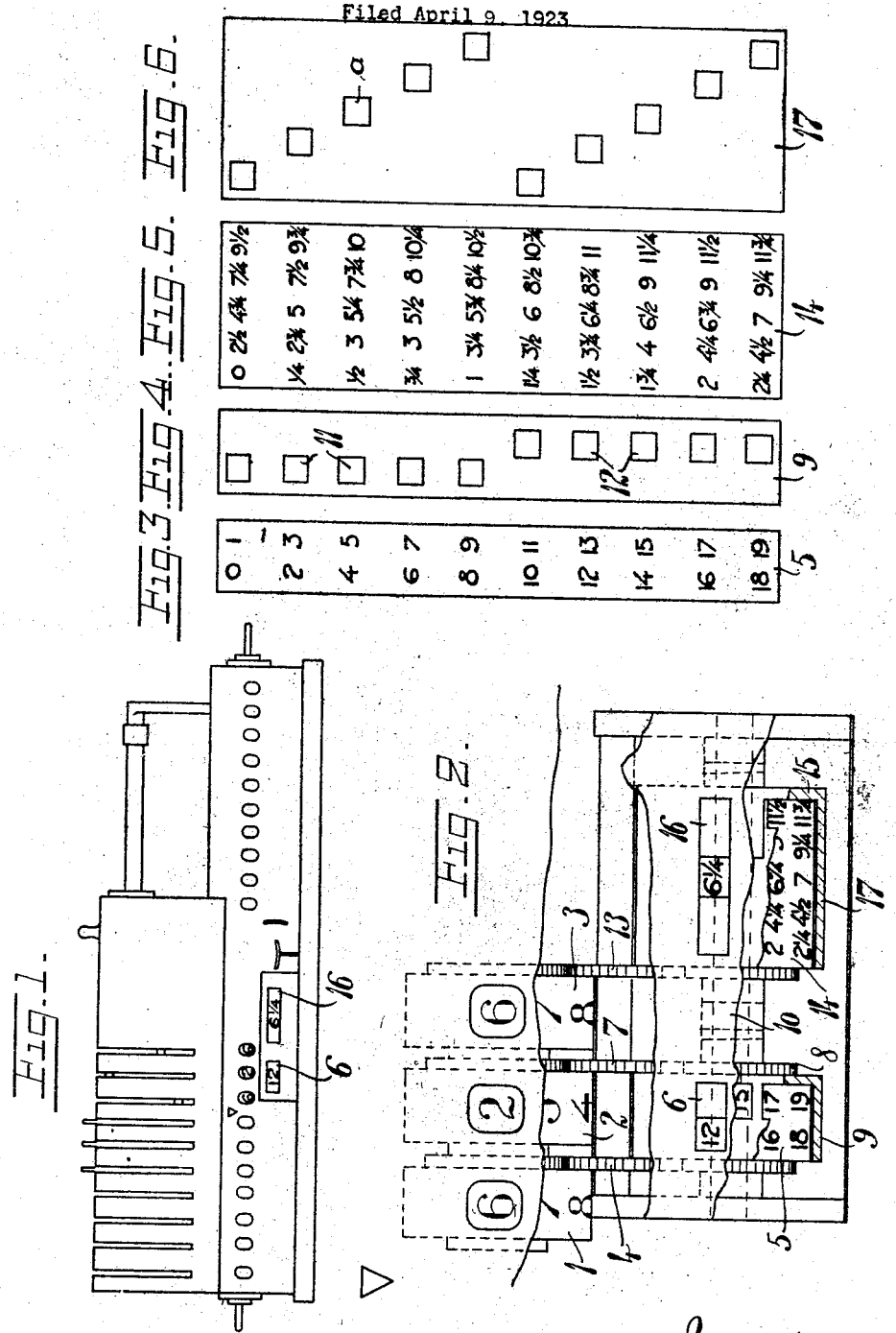
July 29, 1924.
H. HERLITZ
CALCULATING MACHINE
Filed April 9, 1923
1,502,952
Inventor
Hans Herlitz Patented July 29, 1924.

UNITED STATES PATENT OFFICE.

HANS HERLITZ, OF GOTHENBURG, SWEDEN.

CALCULATING MACHINE.

Application filed April 9, 1923. Serial No. 630,938.

*To all whom it may concern:*

Be it known that I, HANS HERLITZ, a citizen of the Kingdom of Sweden, residing at Gothenburg, Sweden, have invented new and useful Improvements in Calculating Machines, of which the following is a specification.

The calculating machines as at present in use are based, as known, upon the decimal-system. The circumstance, however, that a great number of money, measure and weight systems are still employed which are based upon other numbers of relation between the various units than the number 10 characteristic to the decimal system, as, for instance, the British pound system, causes great difficulties and reduces the employment of the machines for calculations of numbers according to said systems.

In well known multiplication machines it is possible by so called analogy calculation to perform multiplications of measure, money or other quantities based upon other systems than the decimal system. In such case the result, however, will always appear as a number according to the decimal system.

The object of this invention is now to provide means whereby the result as obtained according to the decimal system may automatically be translated to a corresponding result in another system. To this end the calculating machine is provided with a gearing device connected to those members of any of the counters of the machine corresponding to the decimals, to translate the indications of said decimal members into those indications of another system corresponding to the decimal equivalent as indicated by the said first mentioned indication.

One example of the invention as adapted to the British pound system will be described hereinbelow with reference to the drawing. It should be noted, however, that the invention may, of course, be applied to any other money, measure or weight system as well.

In the drawing, Fig. 1 shows a front elevation of a calculating machine of the Odhner type constructed according to this invention. Fig. 2 shows part of the totalizing counter of such a calculating machine together with a gearing device according to this invention combined with said counter. Figs. 3, 4, 5 and 6 show developments of indicating wheels included in said gearing device.

The machine shown as an example is adapted for translating the first three decimals of any number, as appearing in the totalizing counter, into the corresponding values in shillings and pence.

In the drawing, the numerals 1, 2 and 3 indicate the first three decimal wheels of the totalizing counter. The first decimal wheel 1 is connected as by a toothed gearing including an intermediate wheel 4 to a figure wheel 5, viz, the shilling wheel, in such a way that one revolution of the wheel 1 will likewise cause one revolution of the wheel 5. The graduation of the shilling wheel 5 is shown in detail in Fig. 3, which shows a development of the wheel 5. The graduation is arranged in two columns, each of which containing ten figures. The left hand column comprises the even shilling numbers from 0 to 18 inclusive, while the right hand column comprises the odd shilling numbers from 1 to 19 inclusive. With this graduation the shilling wheel upon each step of the first decimal wheel 1 (=0.1) will move a distance corresponding to two shillings which is what is desired, inasmuch as 0.1£=2sh. The graduation of the wheel 5 appears through an aperture 6 formed in the front plate of the machine, the height of which corresponds to a figure on the wheel 5 and the width of which corresponds to the width of the wheel 5.

Now proceeding with the second decimal wheel 2 it should be observed, that one half-revolution of said wheel (=0.05) should correspond to 1 shilling, because 0.05£=1sh. The indication of the wheel 2 should thus appear on the shilling wheel 5. To this end the wheel 2 is connected by a toothed gearing, including an intermediate wheel 7, to a wheel 8 coaxial with the wheel 5 and provided with a collar 9 concentrically surrounding the wheel 5. The collar 9, which is shown as developed in Fig. 4, is formed with ten apertures placed so that five thereof, as indicated at 11, will be in register with the left hand figure column of the wheel 5 and the other five, as indicated at 12, will be in register with the right hand column of the wheel 5. Furthermore, the arrangement is such that the apertures 11 are situated on that portion of the ring 9 facing the aperture 6, when the decimal wheel 2 shows 0—4, while the apertures 12 are in register with the aperture 6, when the wheel 2 shows 5—9.

As regards the third decimal wheel 3 it should be observed that each step thereof (=0.001) should correspond to 0.24 penny, as 1£=240 pence. The movement of the third decimal wheel 3 is imparted by means of a toothed gearing including an intermediate wheel 13, to a penny wheel 14 rotatably mounted on an extension of the shaft of the shilling wheel. The cylindrical surface of the penny wheel 14, which is shown as developed in Fig. 5, is graduated in multiples of 0.24 penny rounded off in any suitable way to full quarters of a penny and placed in five columns, each of which containing ten numbers, that is the first column as seen from the left contains the numbers 0 to 2.25 inclusive, the second column contains the numbers from 2.50 to 4.50 inclusive and so on, the last column containing from 9.50 to 11.75 inclusive. The numbers should appear through an aperture 16 formed in the front plate of the machine. The height of this aperture corresponds to a figure on wheel 14, while the width of the aperture 16 corresponds to the entire width of wheel 14.

Each step of the second decimal wheel 2 (=0.01) should correspond to 2.4 pence. To this end there is attached to the shaft 10 a wheel 15 having a collar 17 concentrically surrounding the wheel 14 which is driven by the decimal wheel 2 through the intermedium of the gears 7, 8, the latter of which is keyed to the shaft 10. Said collar 17, which is shown as developed in Fig. 6, is formed with ten apertures placed in such a way that with the second decimal wheel 2 set on "0" and "5" the first column figures of the penny wheel 14 will appear through the aperture 16 of the cover plate, while with wheel 2 set on "1" and "6" the second column figures will appear through aperture 16 and so on. With this construction each step of the second decimal wheel 2 will change the indication of the penny wheel 14 by 2.4 penny, the difference between two adjacent figures amounting to 10x0.24 pence, that is 2.4 pence.

In order to still further illustrate the invention a definite calculation example will be briefly described hereinbelow.

Let it be assumed that a calculating operation in pounds should be performed in the machine and that the result of this operation should be 0.626£ in the totalizing counter. In this case it is of no importance for the matter of this invention, in what way the calculation is performed, let it be by analogy calculation or in any different way.

At each step of the wheel 1 the wheel 5 moves one step or two shillings. After the wheel 1 has moved six steps, that is to say from "0" to "6", the figure row "12, 13" will thus be in register with aperture 6.

The wheel 2 is moved from 0 to 2 so that, as will appear from the statement hereinbefore, the figure "12" of wheel 5 will appear through aperture 6.

The wheel 3 is moved from "0" to "6". In this movement the penny wheel 14 moves to the position in which the figure row "$1\frac{1}{2}$, $3\frac{3}{4}$, $6\frac{1}{4}$, $8\frac{3}{4}$, 11" will register with aperture 16. The wheel 15, 17 controlled by the second decimal wheel 2, has been rotated, however, as a result of the setting of the wheel 2 on the figure "2", into position to register the third aperture, shown at $a$ in Fig. 6, with aperture 16. The number "$6\frac{1}{4}$" will now appear through said aperture. The result will thus be 12sh $6\frac{1}{4}$d.

It should be noted that the described translating mechanism may be applied to any counting mechanism of the machine other than the totalizing counter.

What I claim is:—

In a calculating machine, based on a definite numerical system, which machine comprises a plurality of counters, each including a plurality of figure wheels, the combination with some of the figure wheels of any of said counters, of figure wheels graduated according to a numerical system other than that upon which the machine is based, others of said first-mentioned figure wheels being connected to drums surrounding said second-mentioned figure wheels graduated according to said other numerical system, said drums being provided with apertures to cause the figures of said second-mentioned figure wheels to appear according to some definite rule.

In testimony whereof I have signed my name.

HANS HERLITZ.